United States Patent [19]

Kawasaki et al.

[11] Patent Number: 5,683,647
[45] Date of Patent: Nov. 4, 1997

[54] PROCESS FOR PRODUCING RESIN HOSE

[75] Inventors: Minoru Kawasaki; Hiromasa Ishiguro, both of Komaki, Japan

[73] Assignee: Tokai Rubber Industries, Ltd., Komaki, Japan

[21] Appl. No.: 199,203

[22] PCT Filed: Apr. 30, 1993

[86] PCT No.: PCT/JP93/00582

§ 371 Date: Jun. 13, 1994

§ 102(e) Date: Jun. 13, 1994

[87] PCT Pub. No.: WO94/00287

PCT Pub. Date: Jan. 6, 1994

[30] Foreign Application Priority Data

Jun. 29, 1992 [JP] Japan ........................ 4-194780

[51] Int. Cl.$^6$ ........................................... B29C 49/20
[52] U.S. Cl. .................. 264/513; 264/267; 264/259; 264/314; 425/127; 425/129.1; 425/525
[58] Field of Search ................................ 264/513, 250, 264/267, 268, 275, 276, 279, 508, 314; 425/127, 129.1, 525

[56] References Cited

U.S. PATENT DOCUMENTS

| 3,032,823 | 5/1962 | Sherman | 264/314 |
|---|---|---|---|
| 3,047,910 | 8/1962 | Downs | 264/267 |
| 3,256,378 | 6/1966 | Hauf | 264/267 |
| 3,930,770 | 1/1976 | Gaudet et al. | 425/129.1 |
| 3,996,323 | 12/1976 | Hegler et al. | 264/508 |
| 4,752,208 | 6/1988 | Iwata et al. | 264/513 |
| 5,266,262 | 11/1993 | Narayama et al. | 264/513 |
| 5,445,782 | 8/1995 | Sadr | 264/513 |

FOREIGN PATENT DOCUMENTS

| 1 300 212 | 6/1962 | France . | |
|---|---|---|---|
| 11 08 421 | 6/1961 | Germany . | |
| 62-116119 | 5/1987 | Japan | 264/279 |
| 1122516 | 8/1968 | United Kingdom | 264/513 |
| 1 595 692 | 8/1981 | United Kingdom . | |
| 2171046 | 8/1986 | United Kingdom | 425/129.1 |

OTHER PUBLICATIONS

Patent Abstracts of Japan, vol. 12 No. 149, May 10, 1988 JP-A-62 270315 (Toyo Seikan Kaisha Ltd).

*Primary Examiner*—Catherine Timm
*Attorney, Agent, or Firm*—Jacobson, Price, Holman & Stern, PLLC

[57] ABSTRACT

It is unnecessary to carry out the grinding process for improving the accuracy in the inner surface configurations, dimensions and the like of the hoses around the portion to be connected to a mating member. Further, the flashes, resulting from the material leakage, are inhibited from producing during the injection molding of a connecting portion following the blow molding of a hose body. Accordingly, it is possible to obviate the deflashing and finishing process and to prevent the material shrinkage from occurring.

After forming a hose body 12 with a thermoplastic resin by blow molding, the hose body 12 is set in an injection molding mold 20 including an inner mold 24 and an outer mold 22, and the inner mold 24 is adhered to the opening portion of the hose body 12 by sealing means 28, 30, 40 or 42 in a fluid-proof manner. In this state, a material is injected into a cavity 26 neighboring around the opening portion, thereby forming a connecting portion to be connected to a mating member in the resulting hose and integrating it with the hose body 12.

6 Claims, 21 Drawing Sheets

(A)

(B)

(A)

(B)

(A)

(B)

(C)

PROCESS FOR PRODUCING RESIN HOSE

TECHNICAL FIELD

The present invention relates to a process for producing a resin hose which is optimum for producing air duct hoses, filler hoses or the like for automobiles.

BACKGROUND ART

In a field of hoses, for instance, air duct hoses, filler hoses or the like for automobiles, it has been tried to replace rubber hoses with hoses made of resin recently. Some of the rein hoses have been put into actual applications.

The resin hoses have advantages in that they have light specific gravities compared to those of the rubber hoses, they can be lightweighted, they can make an integrally formed product comprising soft portions and hard portions, and they allow a high degree of freedom in designing the configurations or the like.

In the resin hoses, hard resinous materials are used for portions which require hardness, and soft resinous materials are used for portions which require softness. When forming the hoses, the hard and the soft portions can be formed integrally with the two materials, e.g., the hard and the soft resinous materials. However, in the rubber hoses, it is difficult to constitute the hard and the soft portions with an integrally formed product. Usually, in the rubber hoses, metallic pipes make the portions which require hardness, rubber hoses make the other portions which require softness and flexibility, and they are assembled together.

In the resin hoses, the soft and the hard portions can be made with the integrally formed product. Hence, the number of the component parts can be decreased, and the production costs can be reduced.

In the resin hoses, the phrase, "the high degree of freedom in designing the configurations or the like," means that the hose are limited less configurationally because they fully resist negative pressures. On the other hand, in the rubber hoses, when the rubber hoses are formed in a flattened shape in cross-section at a portion thereof and they are subjected to negative pressure, they are likely to deform at the portion. Consequently, compared to the resin hoses, the rubber hoses allow a lower degree of freedom in designing the configurations or the like.

By the way, in the resin hoses, blow molding processes are employed preferably as a process for forming the resin hoses. In the blow molding processes, a tubular or bag-shaped parison is usually expanded by blowing air thereinto, and it is adhered to inner surfaces of a forming mold, thereby being formed into a predetermined configuration. Accordingly, the outer surfaces of the formed products can be formed into predetermined shapes accurately with the forming mold. However, the inner surfaces of the formed products are not formed with the mold surfaces, but they are formed in the free states. Hence, the inner surfaces are inevitably inferior in terms of the configurations and the dimensional accuracy.

However, the hoses are usually connected by fitting a mating member, e.g., a metallic pipe or the like, into the inside of them at the end which usually makes the connecting portion, and at the same time it is necessary to securely provide a sealing property at the connecting portion. If such is the case, when the inner surfaces of the connecting portion of the hoses are inferior in terms of the configurations and the dimensional accuracy, for example, when the hoses have fluctuating inside diameter dimensions or thickness, uneven thickness and convexities and concavities on the inner surfaces, the sealing property cannot be fully secured at the connecting portion between the hoses and the mating member.

Therefore, in the resin hoses made by the above-described blow molding processes, the inner surfaces of the connecting portion are finished to predetermined shapes and dimensions by grinding.

However, when the grinding is carried out onto the hoses, not only the number of the hose production processes increases, but also there remain ground chips at the processed portions and the peripheries. Consequently, it is necessary to employ a washing process for removing the ground chips, thereby further increasing the number of the hose production processes and resulting in increasing production costs.

Hence, the present inventors invented a process for producing a resin hose and proposed it in the prior patent application (Japanese Patent Application No. 3-39,145). The process is characterized in that a hose body is formed of a thermoplastic resin by blow molding, and thereafter a connecting portion to be connected to a mating member is formed and integrated with the hose body by injection molding while the hose body is set in a forming mold for injection molding.

FIG. 20 illustrates one of the preferred embodiments according to the invention set forth in the prior patent application. In the process illustrated in the drawing, a hose body 100 is first obtained by blow molding with a thermoplastic resin. The hose body 100 is then set in a forming mold 102 for injection molding. Thereafter, a material is injected into the cavity and cured therein, thereby forming a connector end 104 to be connected to a mating member and integrating it with the hose body 100.

When blow molding the hose body, the inner surfaces are formed in the free states as aforementioned, namely they are formed without receiving any direct restrictions from the forming mold. Accordingly, the inner surfaces fluctuate dimensionally. Hence, as schematically illustrated in FIG. 21, when the blow-molded hose body 100 is set with respect to the injection molding mold and an inner mold (e.g., a mandrel) 106 is fitted into the opening of the hose body 100, there might arise a clearance between the inner surface of the end opening or the neighboring portion of the hose body 100 and the inner mold 106.

If such is the case, when the material is injected into the cavity formed between the inner mold 106 and an outer mold 108, there arises the problem in that the material leaks through the clearance and produces a flash 110. When the flash 110 is produced in a greater amount, the material is supplied insufficiently for the connector end 104 and the neighboring portion to be connected to the mating member, and there might arise fears for the failures such as the material shrinkage or the like.

On the contrary, when the diameter of the inner surface of the opening of the hose body 100 is smaller than the outside diameter of the inner mold 106, it is difficult to insert the inner mold 106 into the opening of the hose body 100. Consequently, the operational efficiency deteriorates.

The present invention has been developed to solve these problems.

DISCLOSURE OF THE INVENTION

The present invention features that a hose body is formed of a thermoplastic resin by blow molding, and thereafter said hose body is set in an injection molding mold including an inner mold and an outer mold, during which said inner mold is adhered to an opening portion of said hose body in a fluid-proof manner by sealing means, and a material is injected into a forming cavity neighboring around said opening portion while maintaining the aforementioned state, thereby forming a connecting portion to be connected to a mating member in a hose and integrating it with said hose body.

As a method for adhering the opening portion of the hose body to the inner mold, a contactor portion of the inner mold can be formed in a tapered inclined surface, and this inclined surface can be pressed onto the opening of the hose body so as to cause the adherence. As an adhering member of the hose body, an opening end can be utilized. Further, a diameter-increasing portion whose inside diameter increases can be formed at the opening portion of the hose body, and the resulting stepped portion can be utilized as the adhering member. Furthermore, the opening portion can be simply enlarged in a flared shape, and the enlarging inner peripheral surface can be utilized as the adhering member.

As an adhering member of the inner mold, an adhering portion can be formed of a resilient substance, such as rubber or the like, in addition to the inclined surface. The adhering portion is then expanded by means of fluidic pressures or mechanically so as to increase the outside diameter, and accordingly it can be adhered to the inner peripheral surface of the opening portion of the hose body. When the adhering portion of the inner mold is made to enlarge, the inner peripheral surface of the opening portion of the hose body can be an ordinary inner peripheral surface. However, it can be formed in the aforementioned stepped portion, flared diameter-increasing portion or the like.

Further, the adhering portion of the inner mold can be formed of a resilient substance such as rubber or the like, the adhering portion can be deformed by compression so as to press the inner mold into the bore of the hose body, and thereby the adhering portion can be brought into contact with the inner peripheral surface of the predetermined opening portion. If such is the case, even when removing the inner mold from the injection molding mold, it is necessary to carry out the removing by utilizing the deformation of the adhering portion made of the resilient substance.

Furthermore, when a resin is soft, the resilient deformation can be utilized. If such is the case, the adhering portion of the inner mold can be made of metal. Namely, the adhering portion is formed on the outer peripheral surface of the inner mold in a form of a projection streak which projects in a ring shape. The top of the projection streak is pressed onto the inner peripheral surface of the hose body, thereby carrying out the sealing.

Regarding the adhering property between the outer mold and the hose body, there is little problem because the outer peripheral surface of the molded body is molded with high dimensional accuracy by the mold surface even in the blow molding. However, in order to carry out the sealing further securely or to enable secure positioning, it is preferred to form a stepped portion or the like on the outer peripheral surface.

According to a further aspect of the present invention, the present invention features that a hose body is formed of a thermoplastic resin by blow molding, and thereafter said hose body is set in an injection molding mold including an inner mold and an outer mold, during which an end of said inner mold is fitted into an opening portion of said hose body, a fitted portion of said inner mold includes an inner core body and a resilient layer covering an outer peripheral surface of said inner core body, and said molding mold includes means for increasing a diameter of said resilient layer, thereby adhering said inner mold to an inner surface of said opening portion of said hose body, and a material is injected into a forming cavity neighboring around said opening portion while maintaining the aforementioned state, thereby forming a connecting portion to be connected to a mating member in a hose and integrating it with said hose body.

According to a furthermore aspect of the present invention, the present invention features that a hose body is formed of a thermoplastic resin by blow molding, and thereafter said hose body is set in an injection molding mold including an inner mold and an outer mold, during which an end of said inner mold is fitted into an opening portion of said hose body, and a material is injected into a forming cavity neighboring around said opening portion while maintaining the aforementioned state, thereby forming a connecting portion to be connected to a mating member in a hose and integrating it with said hose body, wherein:

a diameter-increasing portion, having an inside diameter increasing toward an end of said opening portion, is disposed on an inner surface of said opening portion of said hose body; and an end member, including said portion fitted into said opening portion of said hose body, is formed into a sliding member being slidable with respect to a body of said inner mold in an axial direction, the sliding member provided with a diameter-decreasing portion, whose outside diameter decreases gradually from a rear end to a front end of the sliding member, on an outer peripheral surface of the sliding member, thereby carrying out said injection molding of said connecting portion while adhering the diameter-decreasing portion onto an inner surface of the diameter-increasing portion of said opening portion of said hose body by pushing out the sliding member so as to seal said cavity.

According to a moreover aspect of the present invention, the present invention features that a hose body is formed of a thermoplastic resin by blow molding, and thereafter said hose body is set in an injection molding mold including an inner mold and an outer mold, during which an end of said inner mold is fitted into an opening portion of said hose body, and a material is injected into a forming cavity neighboring around said opening portion while maintaining the aforementioned state, thereby forming a connecting portion to be connected to a mating member in a hose and integrating it with said hose body, wherein:

a diameter-increasing portion, having an inside diameter increasing toward an end of said opening portion, is disposed on an inner surface of said opening portion of said hose body; and an annular-shaped projection is formed on an outer peripheral surface of an end of said inner mold fitted into said opening portion of said hose body, thereby carrying out said injection molding of said connecting portion while pressing the projection onto said diameter-increasing portion so as to seal said cavity during said fitting of said inner mold into said opening portion of said hose body.

According to the present invention, it is possible to produce the advantageous effects similar to those produced by the aforementioned invention which was disclosed in the prior patent application.

Namely, according to the present invention, simultaneously with the forming of the hose, the longitudinal end or the like, i.e., the connecting portion to be connected to the mating member, can be formed into predetermined configurations and dimensions. Accordingly, it is not necessary to carry out the grinding onto the inner surface of the connecting portion after forming the hose, grinding which has been required conventionally.

Hence, not only it is possible to obviate the grinding process, but also it is unnecessary to carry out the washing process for removing the remaining ground chips. Thus, the overall number of the processes is decreased, and consequently the production costs can be reduced.

In addition, when the connecting portion of the hose is formed by injection molding in accordance with the present invention, the inner surface of the connecting portion can be formed with higher accuracy than the case where the inner surface of the connecting portion is ground after forming the hose. Accordingly, the sealing property is improved in terms of the reliability when the metallic pipe or the like, i.e., the mating member, is connected to the connecting portion.

Further, in accordance with the present invention, there arises an advantage in that the hose body and the connecting portion can be constituted with a hard resinous material and a soft resinous material, respectively.

For instance, in air duct hoses for automobiles, since negative pressures are applied to the hoses during service, the hose bodies deform when they are formed of soft materials, and thereby the air suction by way of the hoses decrease in amount to cause the incomplete combustion in the engines.

If the whole hoses are formed of hard materials in order to prevent this failure, the sealing property is damaged when the mating member is connected to the connecting portion.

On the other hand, when the hose body is formed of a hard resinous material and the connecting portion is formed of a soft resinous material in accordance with the present invention, the mechanical strengths, such as the negative pressure resistance or the like, can be given to the hose, and the sealing property can be provided satisfactorily at the connecting portion. Of course, it is possible to partially form a bellows portion in the hose body, and it is further possible to constitute this bellows portion with a soft resin so as to properly give flexibility to the hose.

In the present invention, the sealing means seals between the inner mold and the opening portion of the hose body, for example, at the opening end facing the forming cavity or a predetermined portion in the inner surface of the opening portion, in a fluid-proof manner. Consequently, there scarcely occurs the flashes resulting from the material leakage when injecting the fluidic material into the forming cavity neighboring around the opening portion.

Therefore, it is not necessary to carry out the deflashing process for removing the flashes thereafter. Further, there scarcely arises the problem of the ground chips remaining around the processed portions which results from the deflashing process. Furthermore, it is not needed to carry out the washing process for removing the ground chips.

Moreover, since there hardly arises the flashes, the material can be fully filled into the cavity in a prescribed amount. Hence, there occurs no failure, such as the material shrinkage or the like in the connecting portion.

In accordance with the further aspect of the present invention, the outer peripheral portion of the fitted portion of the inner mold fitted into the hose body is constituted with the resilient layer, and thereby the resilient layer is enlarged diametrically by the diameter-increasing means. When the outside diameter of the fitted portion is designed small in advance, it is possible to fit the inner mold into the opening portion of the blow-molded hose body with ease.

After carrying out the fitting, the outer peripheral portion of the inner mold can be securely adhered to the inner side of the opening portion of the hose body by increasing the resilient layer diametrically, and consequently there arises no clearance therebetween.

Therefore, there occurs no flash resulting from the material leakage when injecting the fluidic material into the cavity neighboring around the opening portion of the hose body.

In accordance with the furthermore aspect of the present invention, when fitting the inner mold into the opening portion of the hose body, the diameter-decreasing portion and the diameter-increasing portion, disposed on the inner surface of the opening portion, are brought into contact with each other by pushing the sliding member out, and thereby the cavity is sealed securely at an end. Under the circumstance, the connecting portion can be formed by injection molding. As a result, there scarcely occurs the problem that the fluidic material leaks out to produce the flashes during the injection molding of the connecting member.

Hence, it is not necessary to carry out the deflashing process thereafter. Further, it is not needed to carry out the washing process for removing the ground chips after the deflashing process.

Furthermore, there occurs no failure, such as the material shrinkage or the like, in the connecting portion, failure which results from the flashes produced in a large amount.

In addition, in accordance with the furthermore aspect of the present invention, the diameter-decreasing portion, disposed on the sliding member of the inner mold, is brought into contact with the diameter-increasing portion, disposed on the inner surface of the opening portion of the hose body, in order to seal the cavity. Accordingly, it is possible to idly fit the front end, which is disposed ahead of the diameter-decreasing portion in the sliding member of the inner mold, into the opening portion of the hose body with a predetermined play.

In other words, it is not necessary to fit the front end, which is disposed ahead of the diameter-decreasing portion, into the opening portion of the hose body without forming any clearance. Consequently, it is possible to carry out the fitting of the inner mold into the opening portion of the hose body with ease, thereby improving the operational efficiency.

In accordance with the moreover aspect of the present invention, the projection is formed on the inner mold side, and thereby the projection is brought into contact with the diameter-increasing portion, disposed on the inner surface of the opening portion of the hose body, during the fitting of the inner mold into the opening portion of the hose body.

With this arrangement, the cavity is sealed in a fluid-proof manner. Accordingly, the flashes can be inhibited from producing when the connecting portion is formed by injection molding under the circumstances. Further, it is possible to obtain the same advantageous effects described above, for example, it is possible to improve the insertability of the inner mold or the like.

BEST MODE FOR CARRYING OUT THE INVENTION

Preferred embodiments according to the present invention will be hereinafter described with reference to the drawings.

Figure 2:
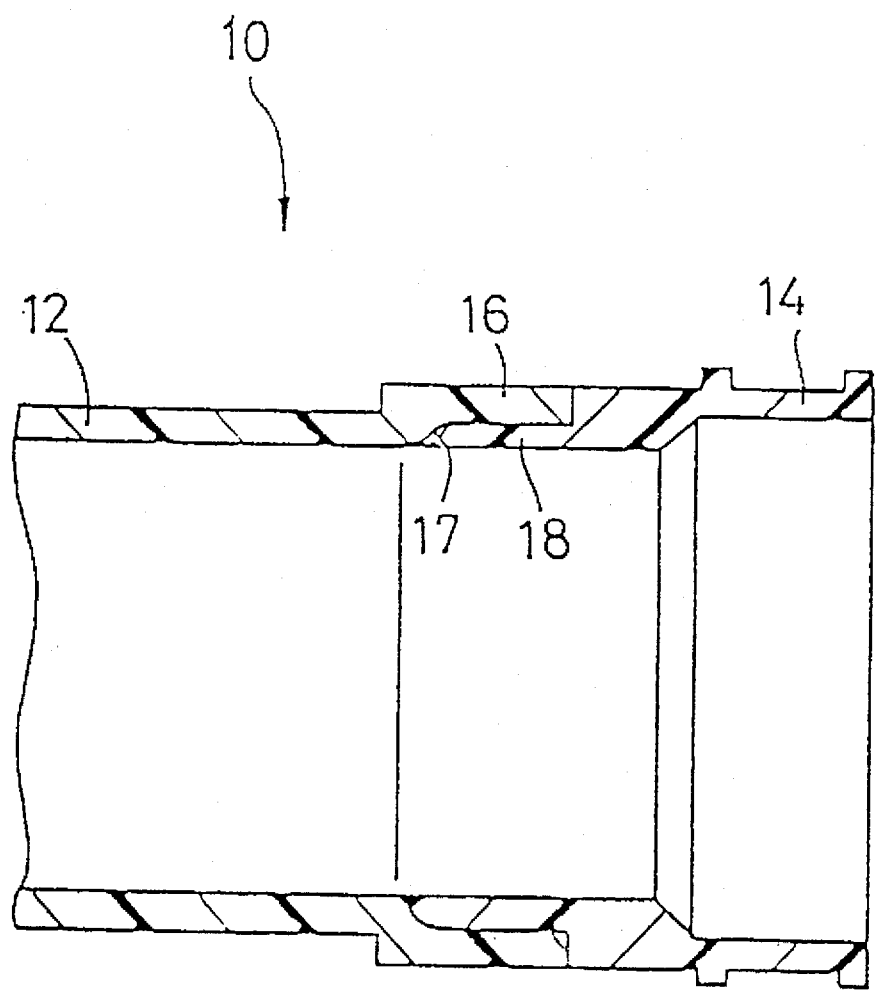
FIG. 2 is a cross-sectional view on a major portion of a resin hose produced by the process.

In FIG. 2, a resin hose which can be favorably used for an air duct hose for automobile is designated at 10. A hose body which is formed of a hard resinous material by blow molding is designated at 12, it has a large-diameter portion 16 at a longitudinal end, and connecting concave is formed on the inner surface of the large-diameter portion 16. Further, at the root on the inner surface of the base of the large-diameter portion 16, there is formed a diameter-increasing portion 17 which enlarges diametrically toward the opening end. In addition, it is possible to constitute the hose body 12 with a hard resinous material at the ends only.

A connecting end which is to be connected to a mating member and which is integrated with the hose body 12 by injection molding a soft resinous material is designated at 14. This connecting end 14 has a tubular connecting convex 18, and this connecting convex 18 is welded and bonded to the aforementioned connecting concave.

In particular, as the hard resinous material for constituting the hose body 12, a polypropylene resin (e.g., "EC-9B" produced by MITSHUBISHI YUKA Co., Ltd. ) having a Rockwell hardness of 94 (in "R" scale) can be exemplified. As the soft resinous material for constituting the connecting end 14, a polymer alloy containing a polypropylene resin and EPDM and having a Shore "A" hardness of 75 (e.g., "SANTOPLAIN 101-75" produced by NIHON MONSANTO Co., Ltd. ) can be exemplified.

Figure 1:
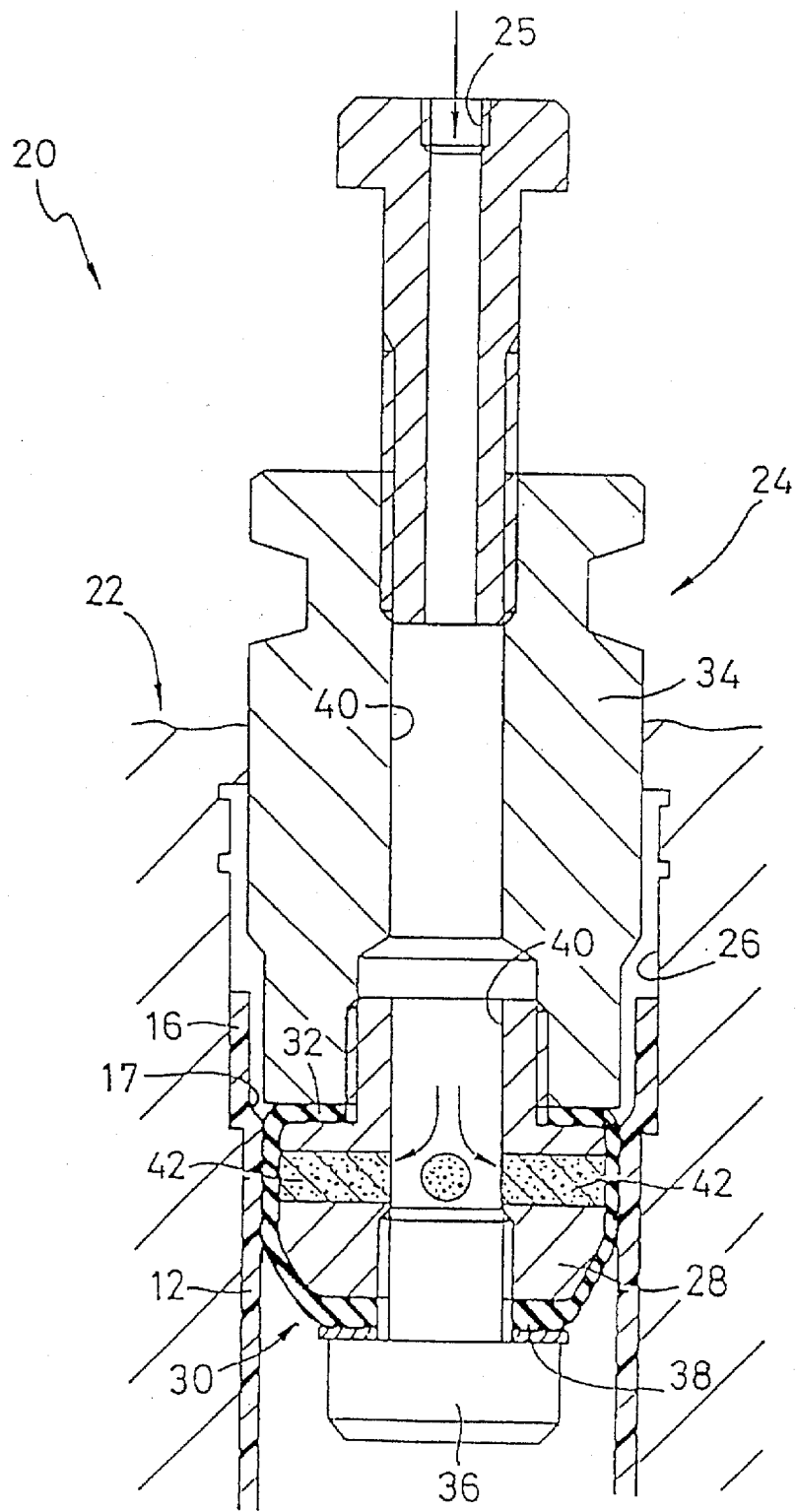
FIG. 1 is an explanatory view on a preferred embodiment of a process for producing a resin hose according to the present invention.

FIG. 1 illustrates a preferred embodiment of a process according to the present invention along with a forming mold for injection molding the connecting end 14. This forming mold 20 has an outer mold 22 and an inner mold (e.g., mandrel) 24, and it further has a cavity 26 for forming the connecting end 14 therebetween.

In the inner mold 24, a portion to be fitted into the end opening of the hose body 12 comprises a metallic core body 28 and a rubber layer 30 covering the outer peripheral surface of the core body 28.

The core body 28 is joined to a main body 34 of the inner mold 24 with thread, and, with the thread joining force, an end 32 of the rubber layer 30 is pressed by the main body 34 and the core body 28.

Into the core body 28, a bolt 36 having a large-diameter head is threaded, and thereby the other end 38 of the rubber layer 30 is pressed by the head of the bolt 36 and the core body 28. These ends are thus pressed, thereby sealing between the outer peripheral surface of the core body 28 and the rubber layer 30 in an air-tight or a fluid-proof manner.

In the main body 34 and the core body 28 of the inner mold 24, there is formed a passage 40 for a fluid such as air, oil or the like. Further, in the core body 28, there is disposed a porous member 42 for introducing the fluid flowing in the passage 40 to the outer peripheral surface.

In particular, the outside diameter of the rubber layer 30 is designed to be smaller by a predetermined dimension than the smallest inside diameter of the end opening among all of the hose bodies 12 obtained by the blow molding.

In this preferred embodiment of the hose production process, the hose body 12 is first formed of a hard thermoplastic resin (or a resin mainly containing a hard resin) by blow molding. Then, the blow-molded hose body 12 is set in the forming mold 20 for injection molding, and a front end of the inner mold 24, specifically speaking, the portion constituted with the core body 28 and the rubber layer 30 is fitted into the end opening of the hose body 12.

At this moment, the inner mold 24 can be inserted into the hose body 12 with ease. This results from the arrangement that the outside diameter of the rubber layer 30 is designed in advance to be smaller than the inside diameter of the end of the hose body 12 obtained by blow molding.

Figure 3:
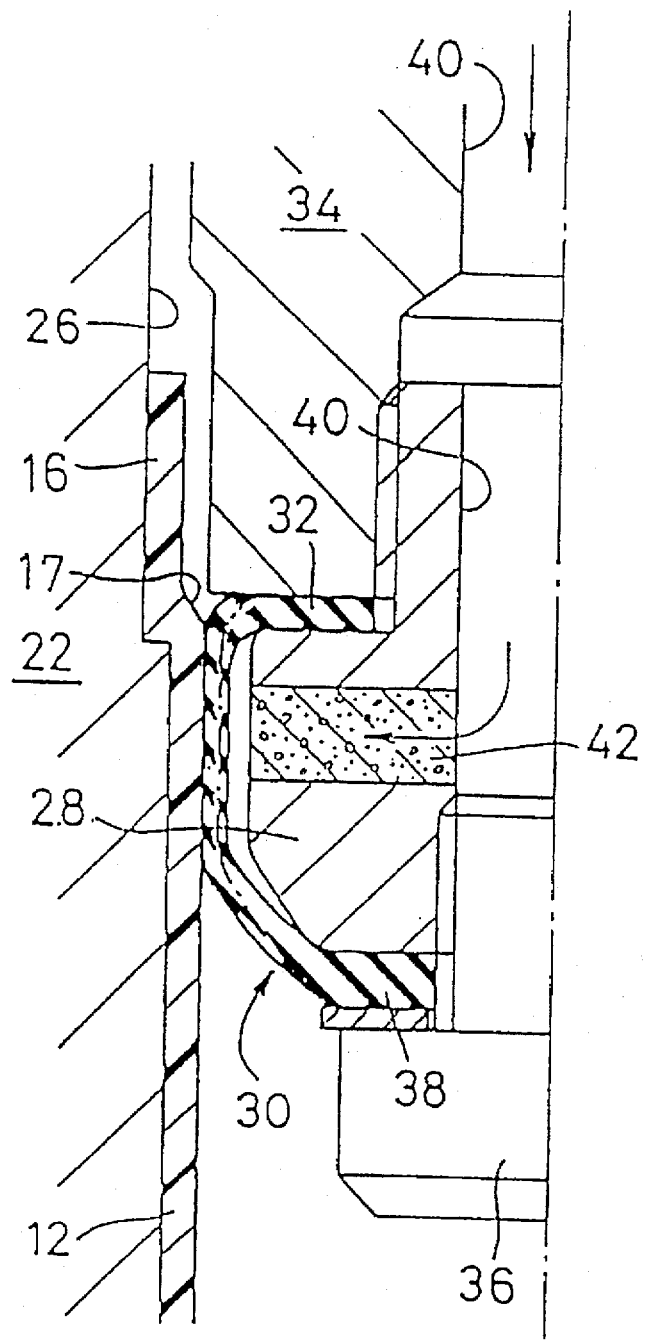
FIG. 3 is an enlarged view on a major portion of FIG. 1.

Then, the fluid, e.g., pressurized air, oil or the like, is supplied through a supply port 25. Accordingly, the rubber layer 30 covering the outer peripheral surface of the core body 28 is expanded by the pressure to increase the diameter. As illustrated in FIG. 3, the rubber layer 30 adheres to the inner surface of the end opening of the set hose body 12 without forming any clearance.

In this state, the aforementioned connecting end 14 can be formed by injecting a predetermined resin material into the cavity 26, and it can be simultaneously welded and bonded integrally to the hose body 12.

According to this process, when the pressurized fluid is not supplied, the inner mold 24 can be inserted into the hose body 12 or removed therefrom with ease. Further, since the inner mold 24 can be securely adhered to the inner surface of the end opening of the hose body 12 by introducing the pressurized fluid, it is possible to inhibit the flashes, resulting from the material leakage through the cavity 26, from producing.

Figure 4:
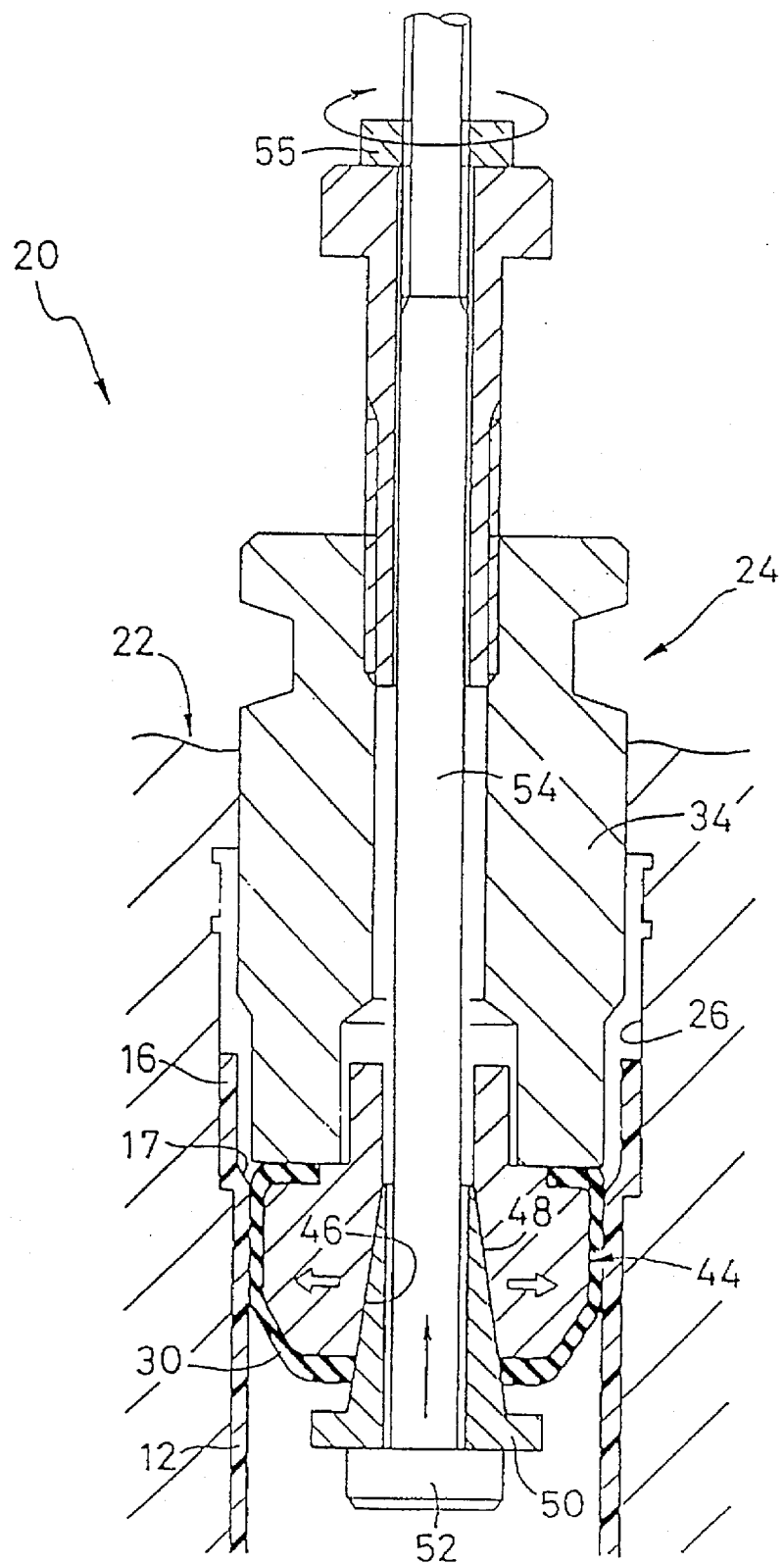
FIG. 4 is an explanatory view on another preferred embodiment according to the present invention.

Another preferred embodiment according to the present invention will be hereinafter described with reference to FIGS. 4 and 5.

Figure 5:
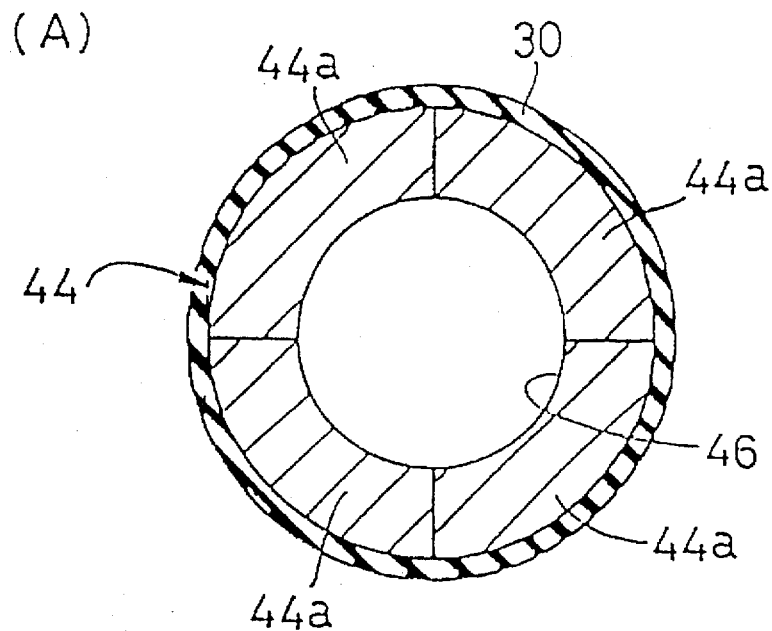
FIG. 5 is an explanatory view on a construction of an inner mold illustrated in FIG. 4.
Figure 5:
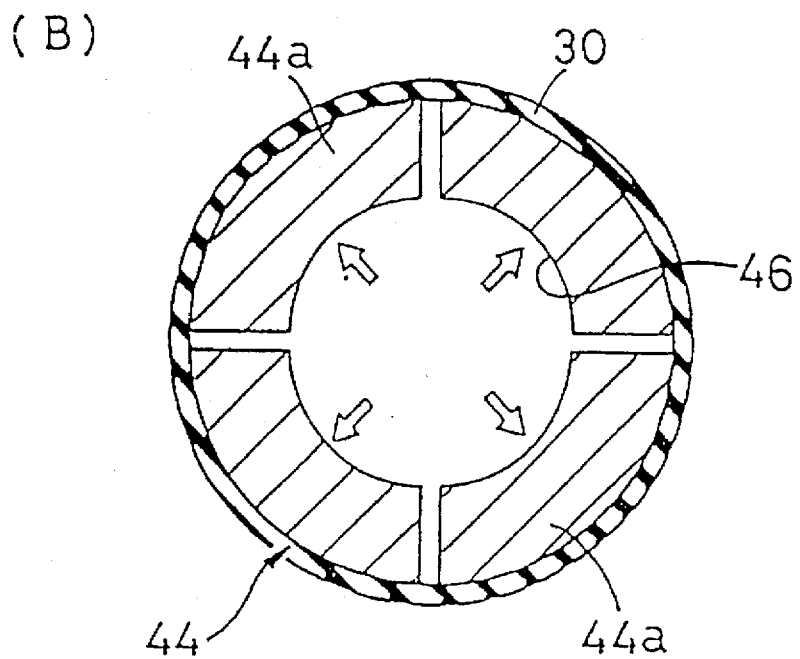

In this preferred embodiment, as illustrated in FIG. 5, a core body 44 is divided into a plurality (e.g., four members herein) of divided bodies 44a, and it has a concave-shaped tapered surface 46 formed at the central portion. Then, a tapered member 50 having a convex-shaped tapered surface 48 is fitted into this central portion, and the core body 44 is pushed and opened up by retracting a bar 54 running through the inner mold 24 and having a large-diameter head 52 at an end (e.g., by turning a nut 55), thereby diametrically increasing the rubber layer 30 covering the outer peripheral surface thereof.

According to this process, it is possible to obtain the advantageous effects produced by the aforementioned preferred embodiment.

Further, it is possible to employ the other deformable resilient substance, such as resin, leather or the like, instead of the rubber layer, and it is possible to bury a reinforcing layer in the rubber layer. Furthermore, it is possible to employ the other means, such as an actuator or the like, for diametrically increasing the rubber layer.

Figure 6:
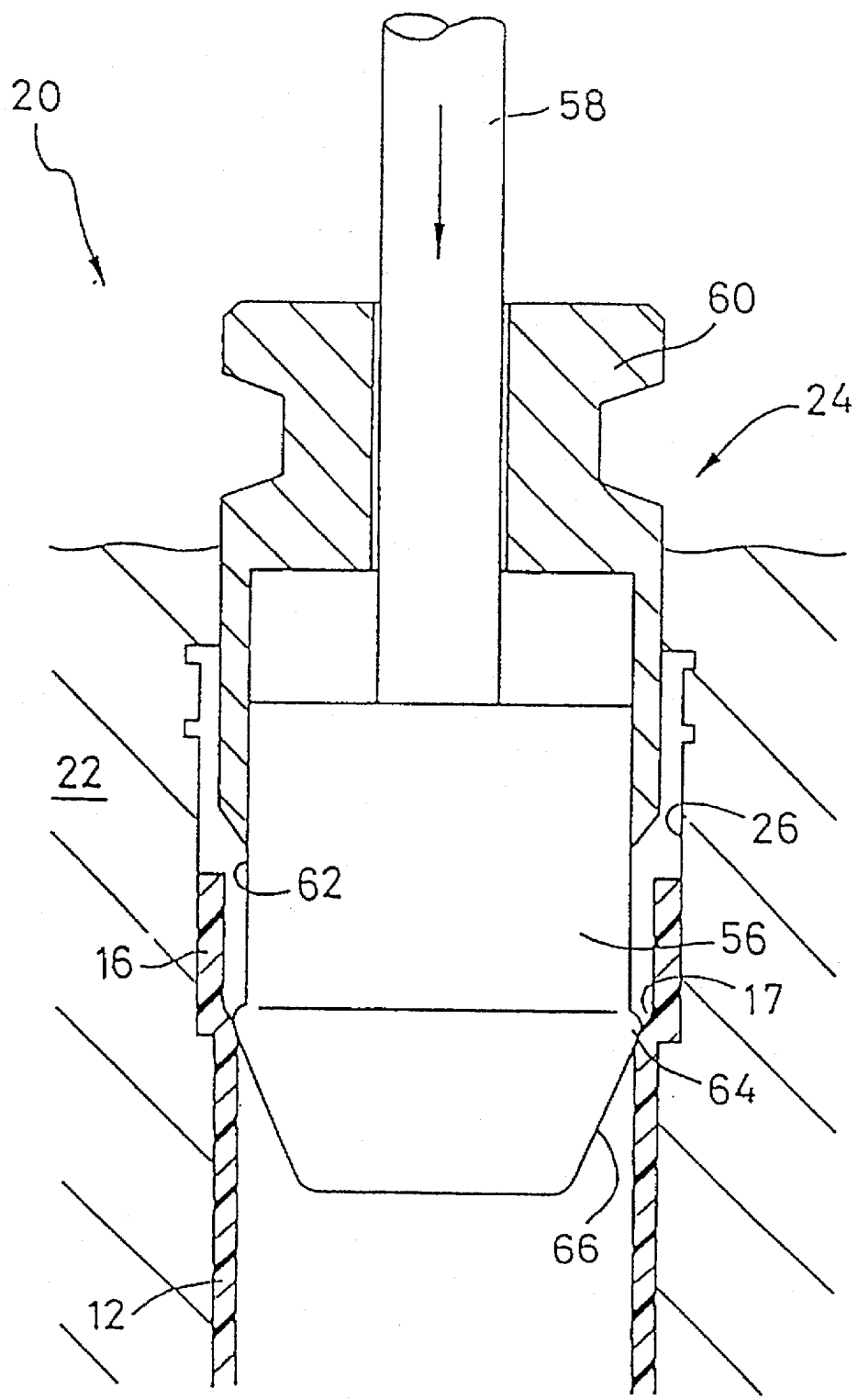
FIG. 6 is an explanatory view on a still another preferred embodiment according to the present invention.

FIG. 6 illustrates still another preferred embodiment according to the present invention. In this preferred embodiment, the inner mold 24 is formed into a sliding member 56 at the front end portion which includes the portions to be fitted into the opening portion of the hose body 12. This sliding member 56 is driven by a predetermined driving means (not shown in the drawing), such as a cylinder or the like, by way of a shaft 58, and thereby it is pushed out of a main body 60 of the inner mold 24 or it is retracted toward the main body 60.

This sliding member 56 has a forming surface 62, which extends straight in the axial direction, and a swollen portion 64, which is disposed at an end of the forming surface 62. Its outer peripheral surface extending from the swollen portion 64 to the front end is formed into a tapered end 66.

In this preferred embodiment of the hose production process, the hose body 12 is first formed of a hard thermoplastic resin (or a resin mainly containing a hard resin) by blow molding. Then, the blow-molded hose body 12 is set in the forming mold 20 for injection molding, and the front end portion of the inner mold 24, is fitted into the end opening portion of the hose body 12, starting at from the longitudinal end of the hose body 12.

Namely, the sliding member 56 of the inner mold 24 is pushed out of the main body 60, thereby fitting the front end portion into the hose body 12. At this moment, the swollen portion 64, which is positioned at the base end of the tapered surface 66 of the sliding member 56, is brought into contact with the diameter-increasing portion 17 of the hose body 12 so as to press the same portion, thereby sealing an end of the cavity 26 in a fluid-proof manner.

In this state, the aforementioned connecting end 14 can be formed by supplying a fluidized resin material into the cavity 26, and it can be simultaneously bonded integrally to the hose body 12.

According to this process, it is possible to inhibit the flashes, resulting from the material leakage through the cavity 26, from producing during the forming of the connecting end 14. Therefore, it is not necessary to carry out the subsequent deflashing process and the washing process for removing the ground chips resulting from the deflashing.

Thus, the hose connecting process is simplified, and the production costs are reduced.

In addition, the reliability on the hose qualities is improved as well.

Figure 7:
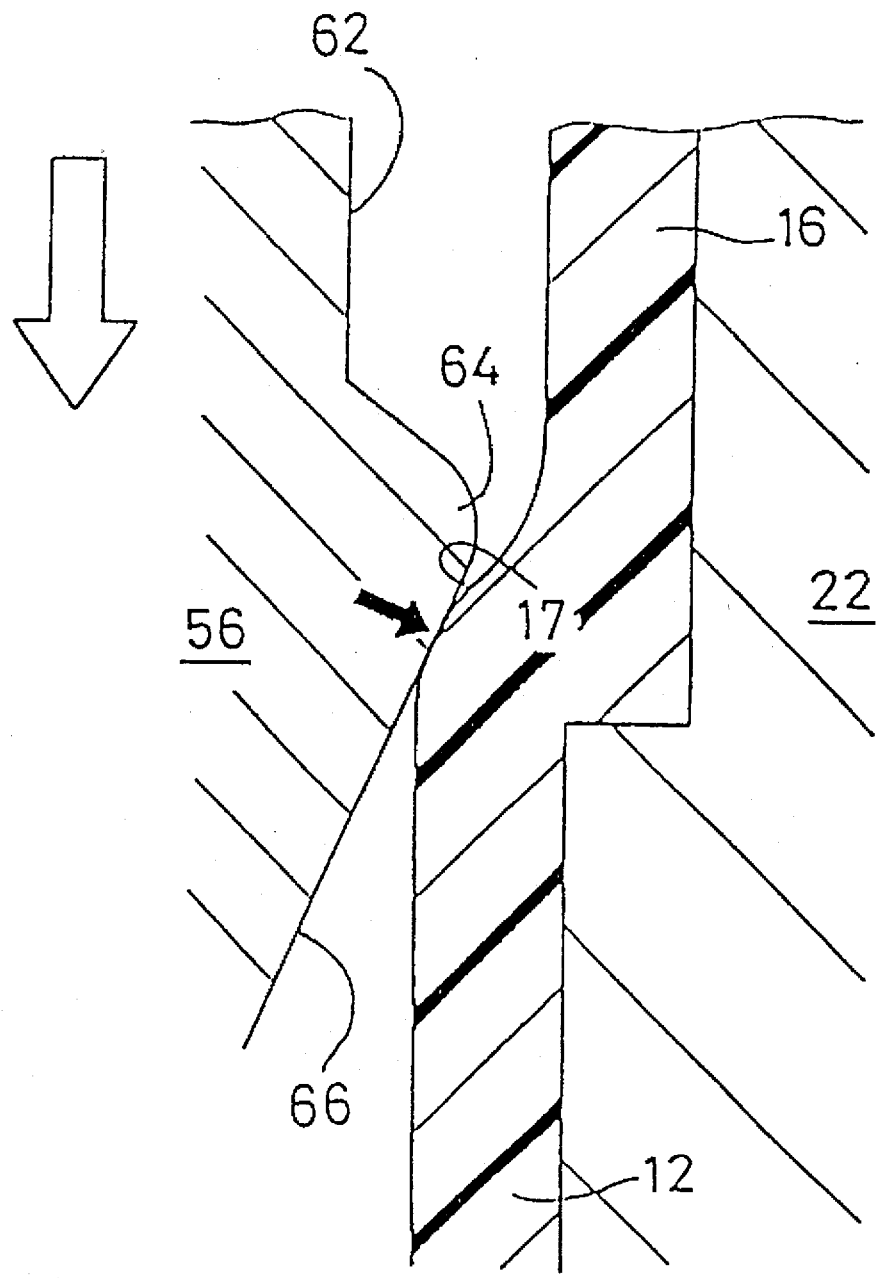
FIG. 7 is an enlarged view on a major portion of FIG. 6.
Figure 8:
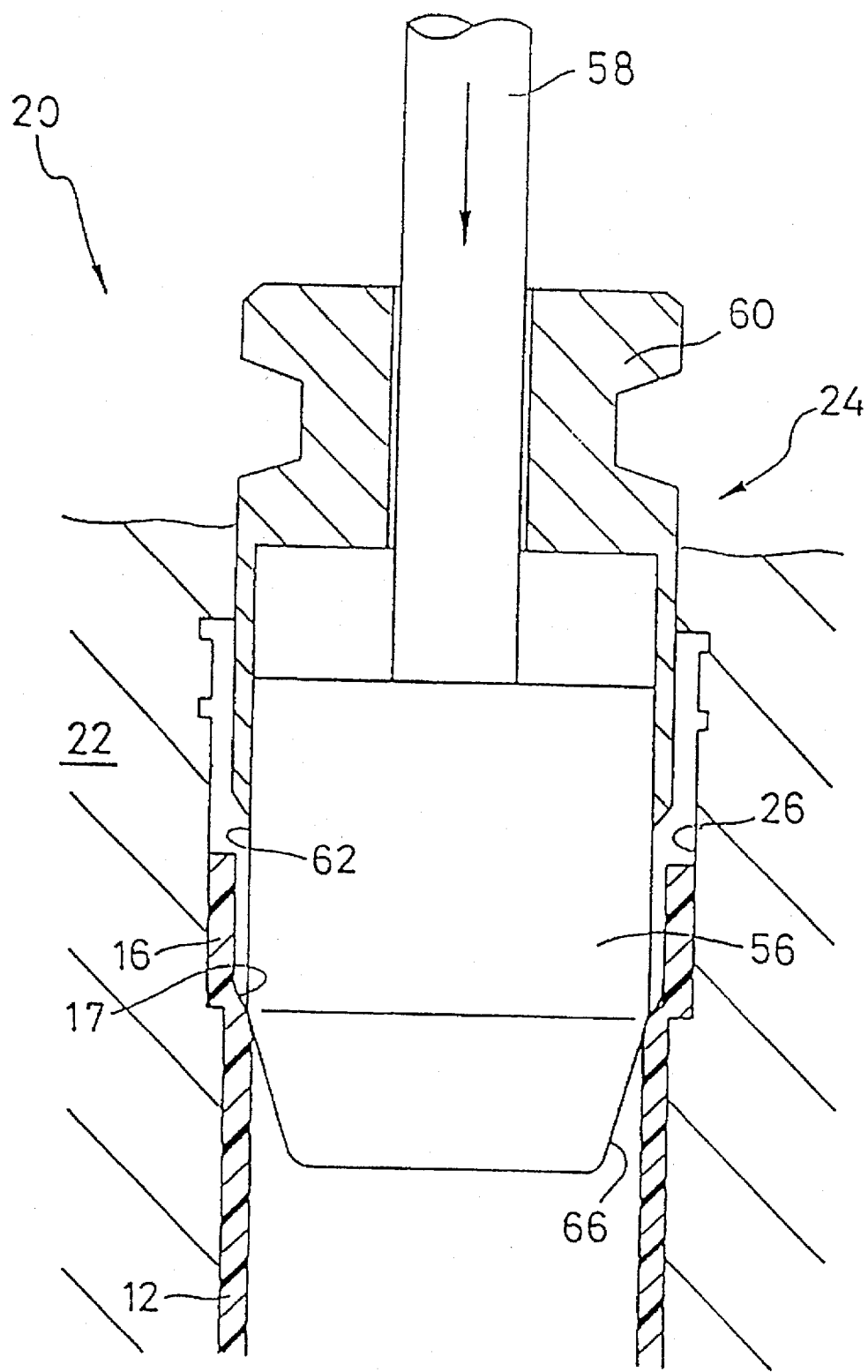
FIG. 8 is an explanatory view on a further preferred embodiment according to the present invention.

In particular, in this preferred embodiment, as shown in FIG. 7 which illustrates the major portions in an enlarged manner, the swollen portion 64 is formed in the sliding member 56, and thereby the outer peripheral surface of the front end portion is formed in the tapered surface 66. However, it is possible not to form the swollen portion like this, but it is possible to directly extend the tapered surface 66 out from an end of the forming surface 62. With this arrangement, it is possible to seal the forming cavity 26 at an end in a fluid-proof manner.

Figure 9:
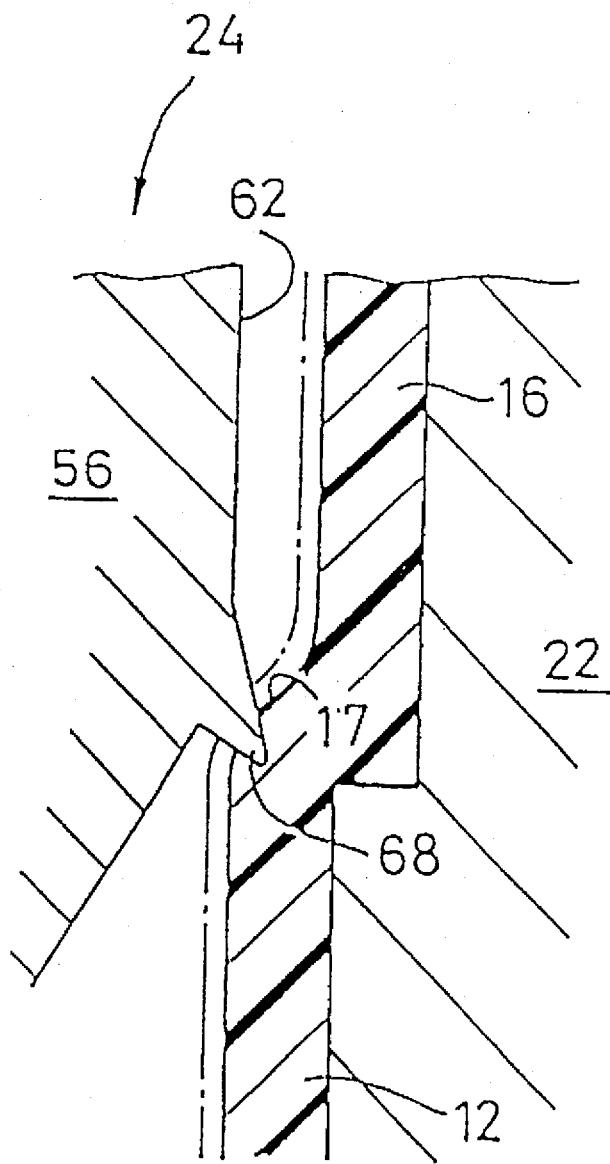
FIG. 9 is an explanatory view on a still further preferred embodiment according to the present invention.

FIG. 9 illustrates a still further preferred embodiment according to the present invention. In this preferred embodiment, the inner mold 24 is provided with a projection 68 which has an annular shape and a wedge-shaped cross-section. During the fitting of the inner mold 24 into the hose body 12, this projection 68 is pressed onto the diameter-increasing portion 17, and part of it is intruded thereinto. Thus, it is possible to seal the forming cavity 26 and to obtain the same advantageous effects as aforementioned.

Figure 10:
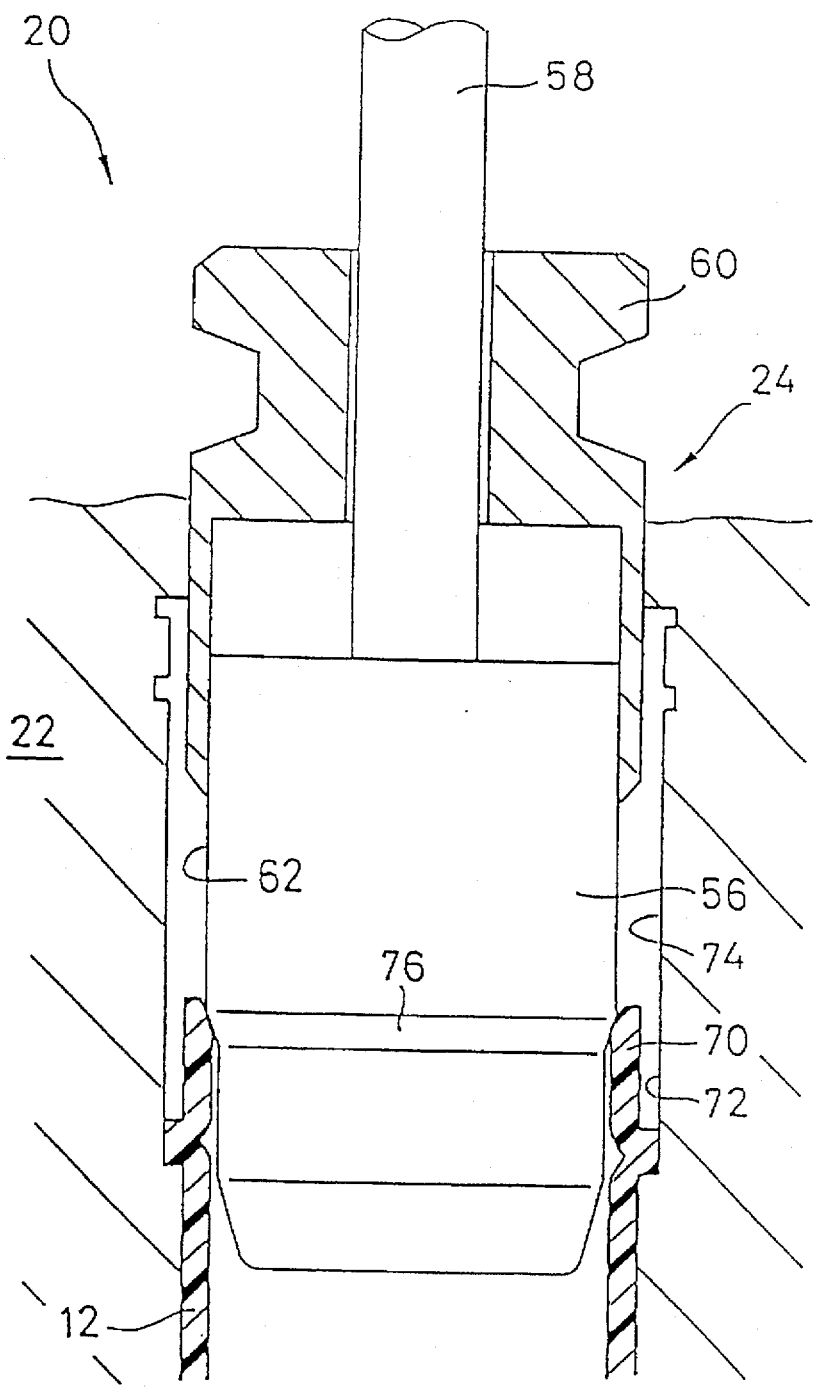
FIG. 10 is an explanatory view on a furthermore preferred embodiment according to the present invention.
Figure 10:
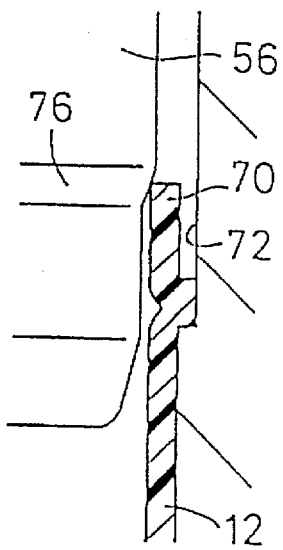

FIG. 10 illustrates a furthermore preferred embodiment according to the present invention.

In this preferred embodiment, a hose body end 70 is designed to have the same diameter as the other portions of the hose body 12, and this hose body end 70 is disposed in a cavity 74 so as to form a predetermined clearance 72 around the outer peripheral surface thereof. While, the sliding member 56 of the inner mold 24 is provided with a tapered stepped portion 76, and the tapered stepped portion 76 is brought into contact with the chamfered front end inner peripheral rim of the hose body end 70. In particular, as illustrated in FIG. 10 (B), the front end surface of the hose body end 70 can be formed in an end surface which is perpendicular to the hose axis, and the stepped portion 76 can be brought into contact with the circumferential edge of this end surface.

In this preferred embodiment as well, it is possible to carry out the injection molding with a resin material, during which the cavity 74 is sealed at an end in a fluid-proof manner, and accordingly it is possible to prevent the injected material from leaking into the hose body 12 and producing flashes.

Figure 11:
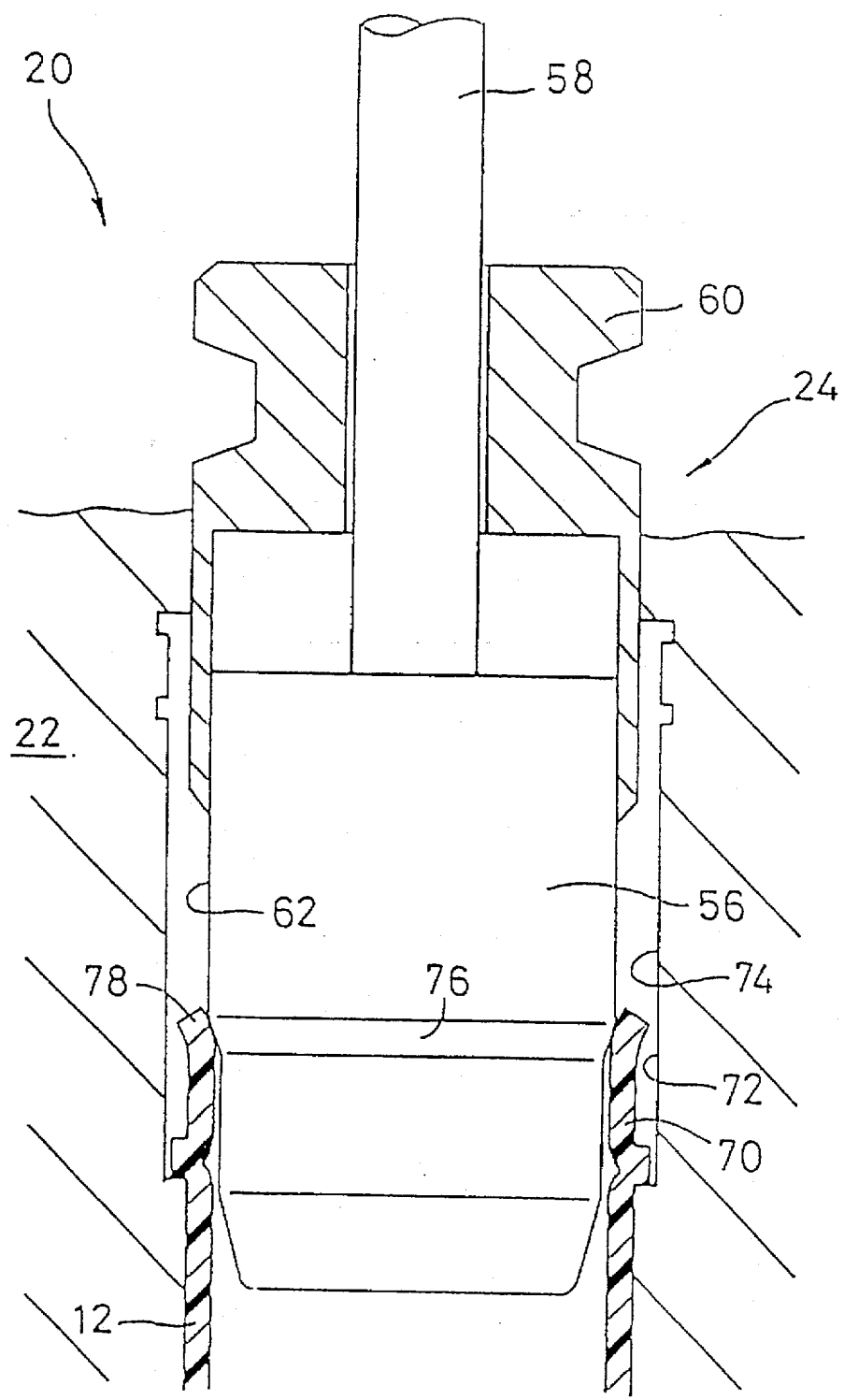
FIG. 11 is an explanatory view on a still furthermore preferred embodiment according to the present invention.

FIG. 11 illustrates a still furthermore preferred embodiment according to the present invention. In this preferred embodiment, the hose body end 70 is formed in a diameter-increasing portion 78, which is slightly flared diametrically, at the front end. The tapered stepped portion 75 of the sliding member 56 is brought into contact therewith, thereby sealing the cavity 74 at an end in a fluid-proof manner.

Figure 12:
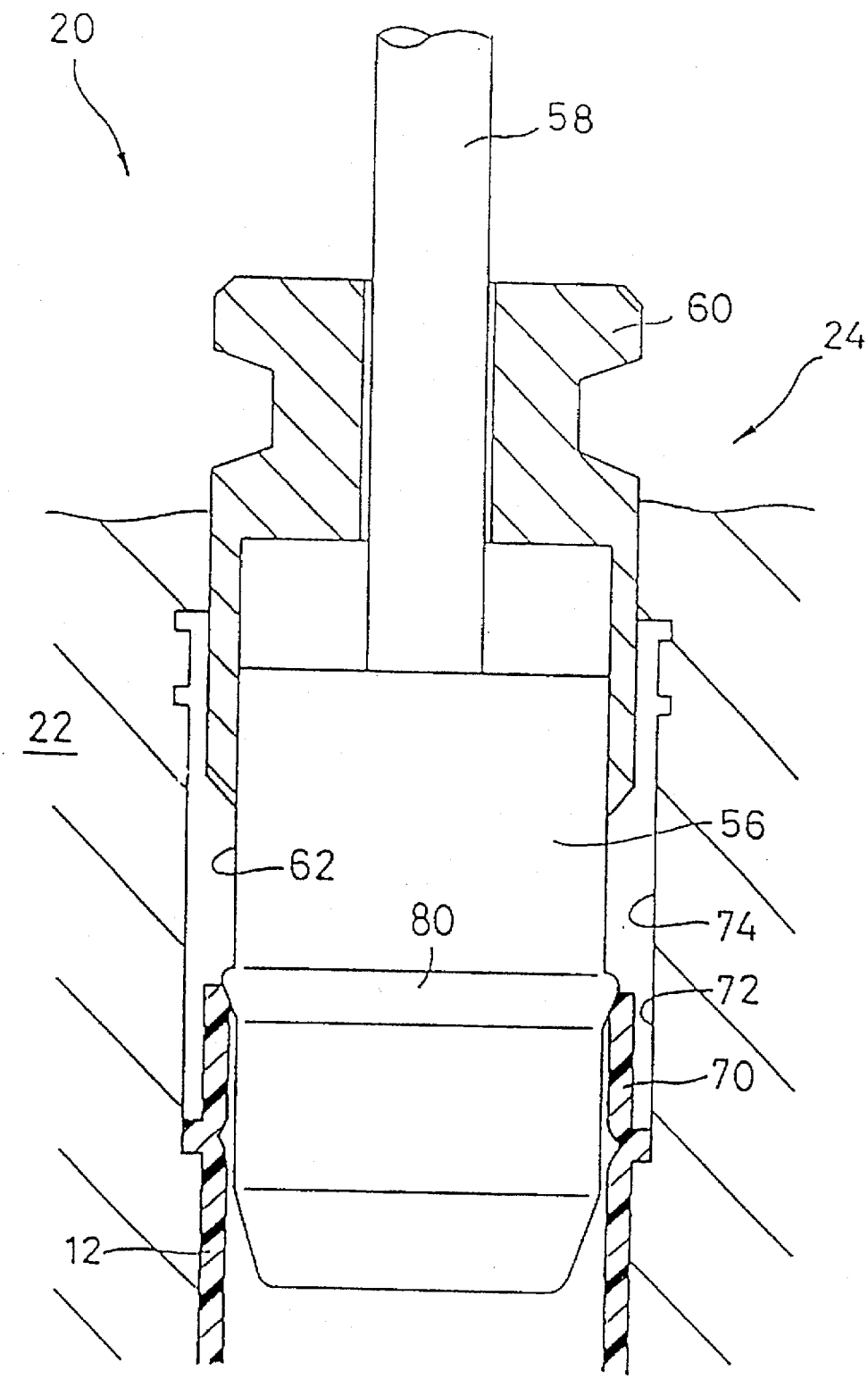
FIG. 12 is an explanatory view on a moreover preferred embodiment according to the present invention.

FIG. 12 illustrates a moreover preferred embodiment according to the present invention, wherein the sliding member 56 is provided with a swollen portion 80 which is swollen outwardly in the radial direction, and this swollen portion 80 is brought into contact with the front end inner peripheral rim of the hose body end 70, thereby carrying out the sealing in a fluid-proof manner.

Figure 13:
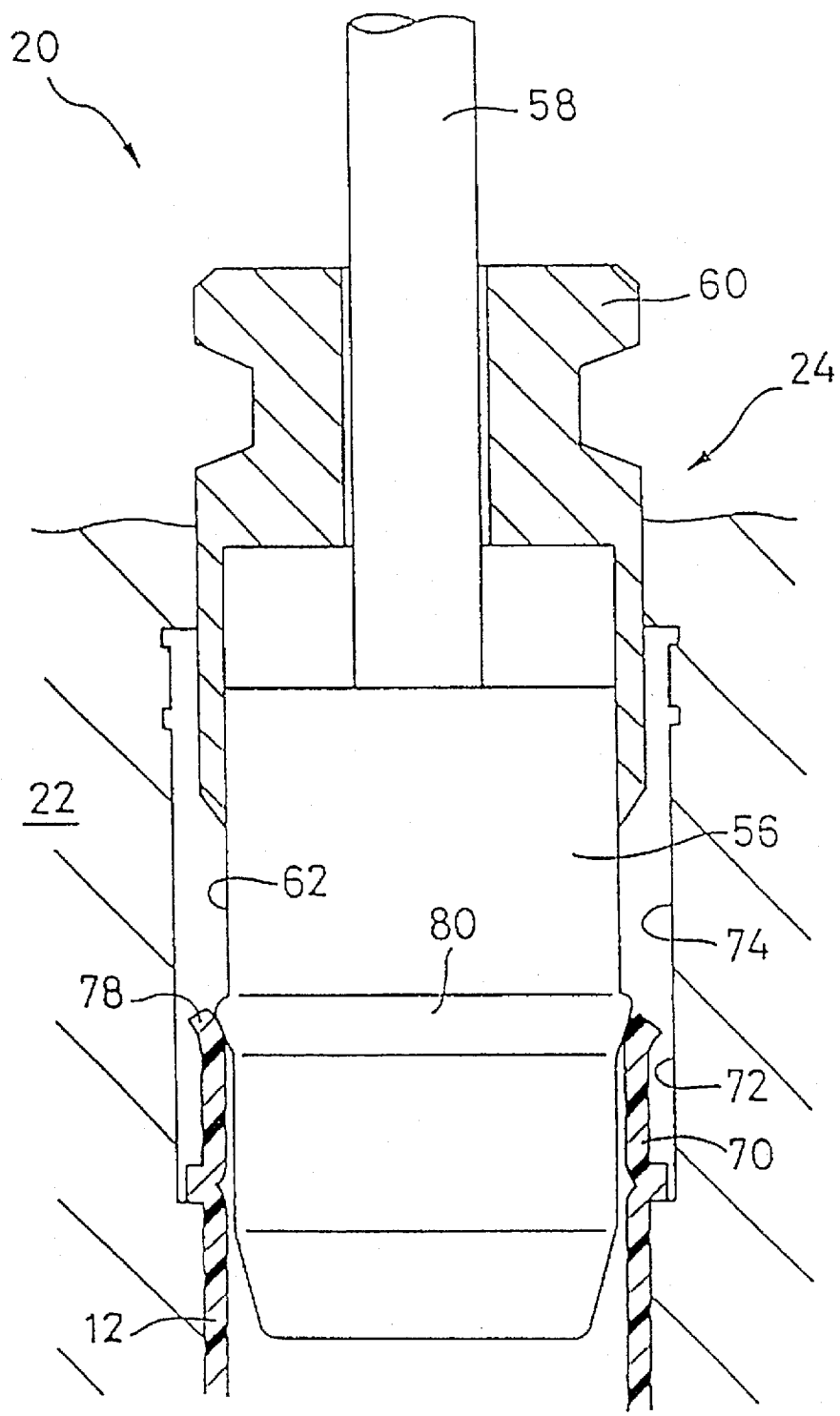
FIG. 13 is an explanatory view on a still moreover preferred embodiment according to the present invention.

FIG. 13 illustrates a still moreover preferred embodiment according to the present invention, wherein a diameter-increasing portion 78 is disposed on the hose body end 70, while a swollen portion 80 is formed in the sliding member 56 of the inner mold 24, and they are brought into contact with each other.

Figure 14:
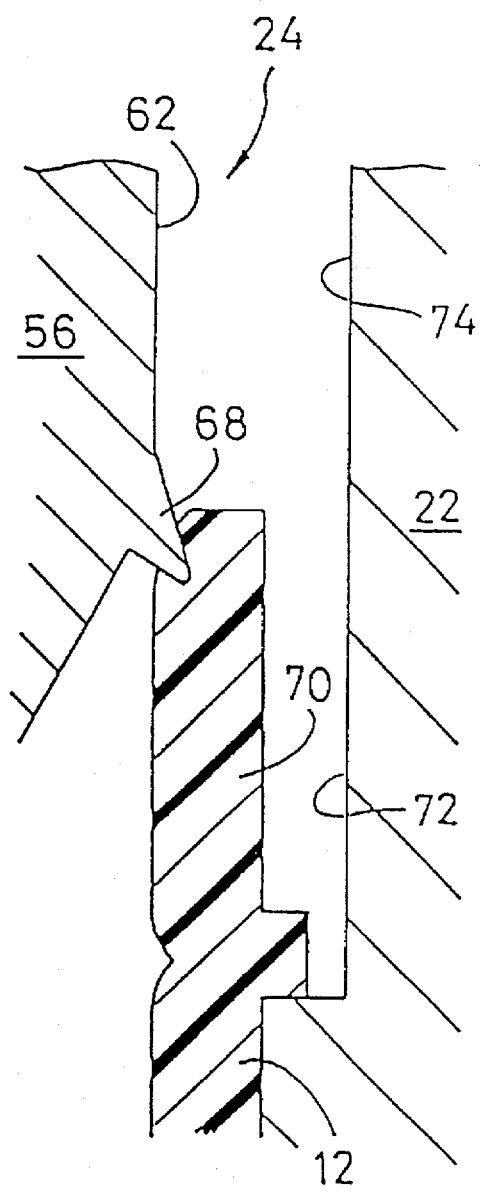
FIG. 14 is an explanatory view on a yet further preferred embodiment according to the present invention.
Figure 14:
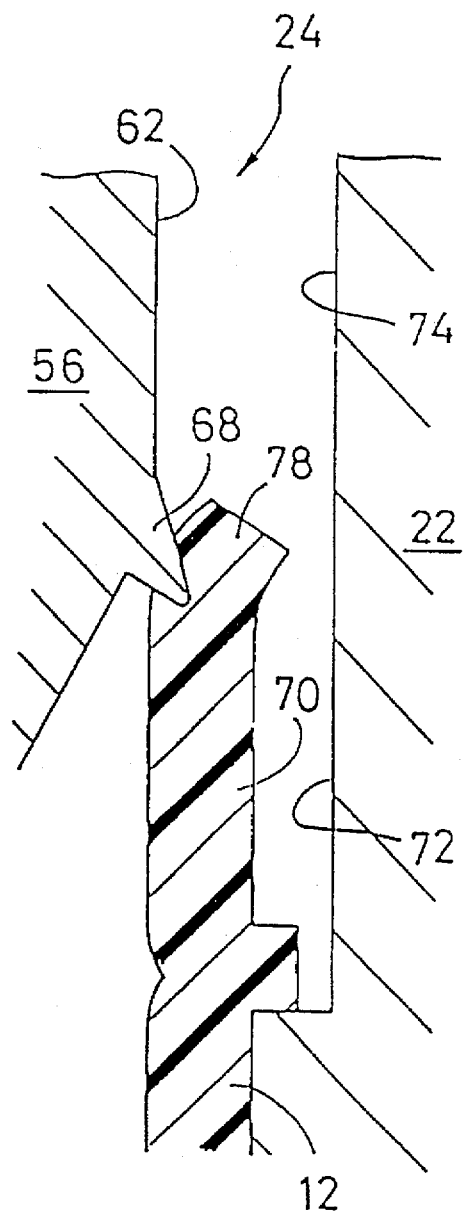
Figure 15:
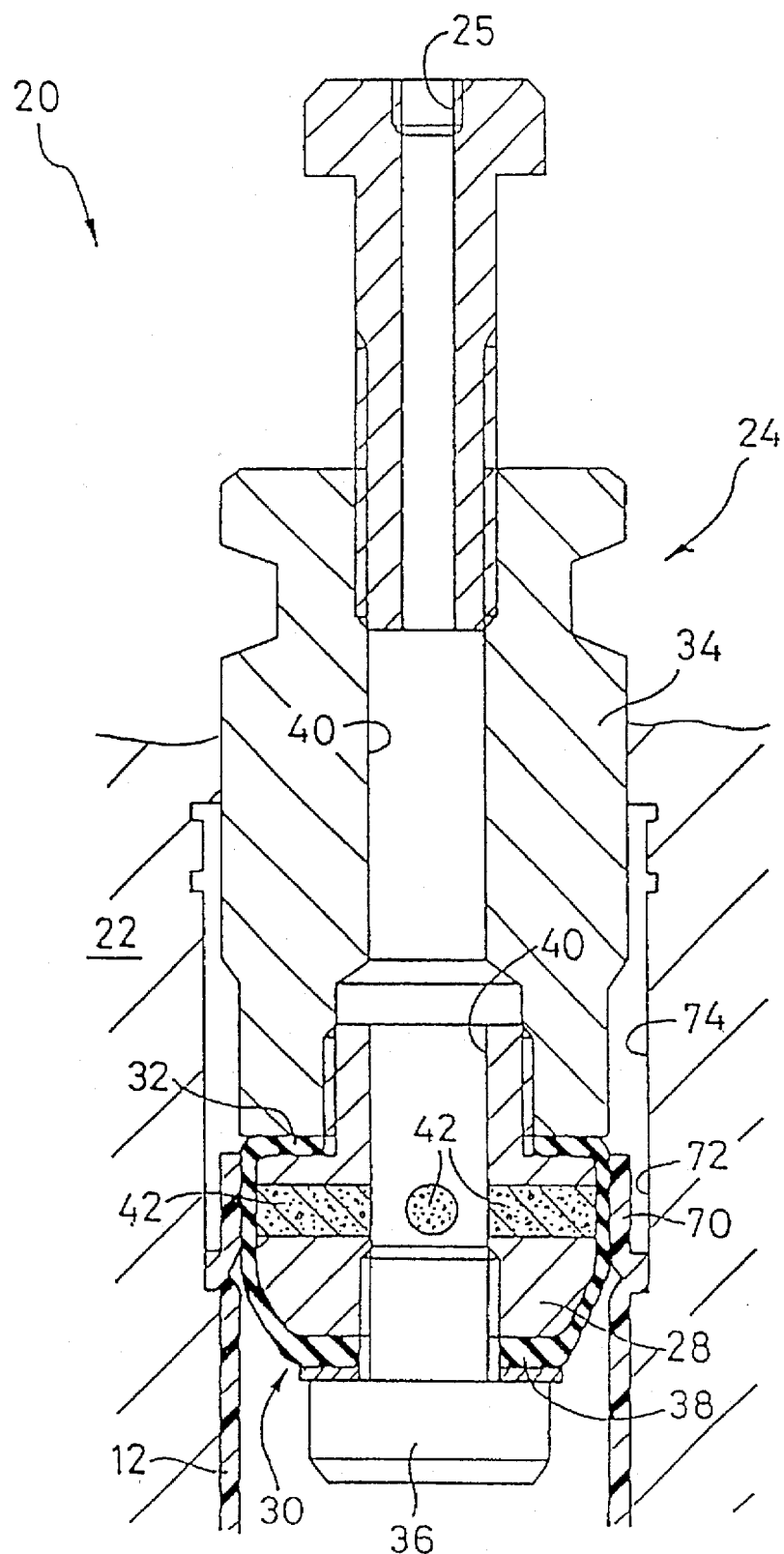
FIG. 15 is an explanatory view on a yet still further preferred embodiment according to the present invention.

FIG. 14 illustrates a yet further preferred embodiment according to the present invention, wherein an annular-shaped projection 68, disposed on the inner mold 24, intrudes into the front end inner peripheral rim or the diameter-increasing portion 78 of the hose body end 70, thereby sealing a cavity 74 at an end. Additionally, FIG. 15 illustrates a yet still further preferred embodiment according to the present invention, wherein the rubber layer 30 covering the core body 28 of the inner mold 24 is expanded, thereby adhering it to the inner peripheral surface of the hose body end 70 in a fluid-proof manner.

Figure 16:
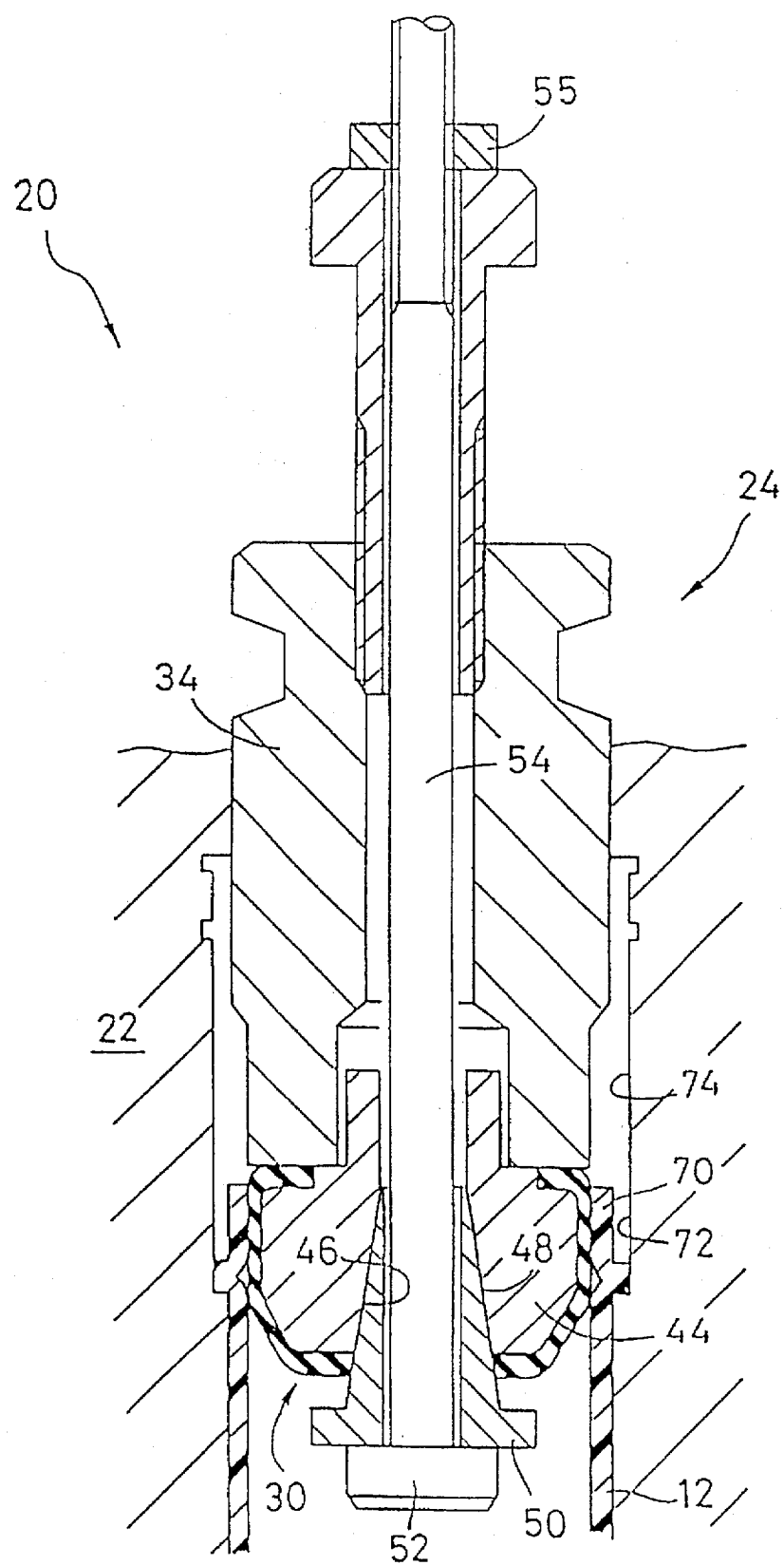
FIG. 16 is an explanatory view on a yet furthermore preferred embodiment according to the present invention.

FIG. 16 illustrates a yet furthermore preferred embodiment according to the present invention, wherein the core body 44 is opened up by retracting the bar 54 so as to expand the rubber layer 30, thereby adhering the rubber layer 30 to the inner peripheral surface of the hose body end 70 in a fluid-proof manner.

Figure 17:
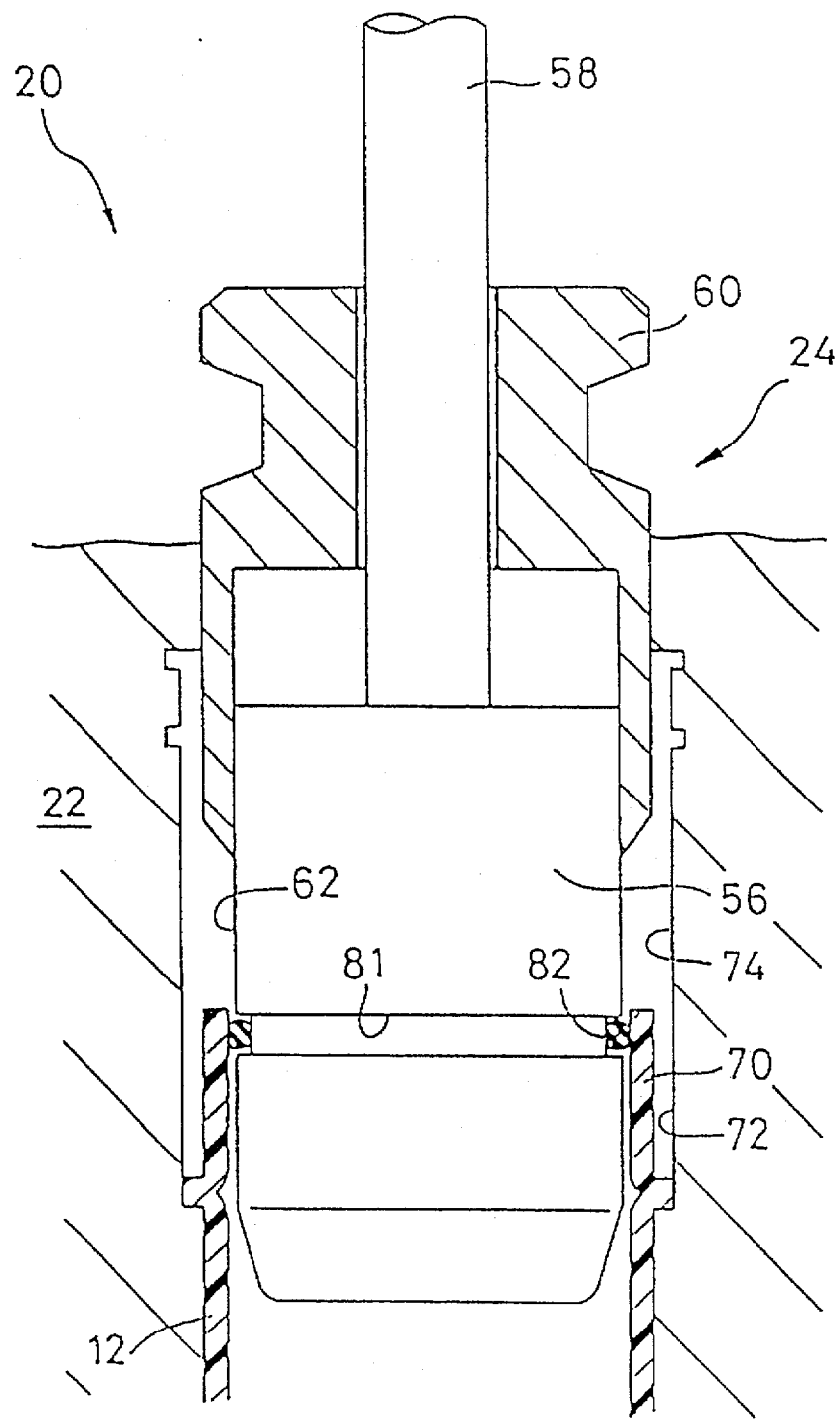
FIG. 17 is an explanatory view on a yet still furthermore preferred embodiment according to the present invention.

FIG. 17 illustrates a yet still furthermore preferred embodiment according to the present invention, wherein the sliding member 56 is provided with an O-ring groove 81, an O-ring 82 is installed thereto, and this O-ring 82 is adhered to the inner peripheral surface of the hose body end 70, thereby carrying out the sealing.

Figure 18:
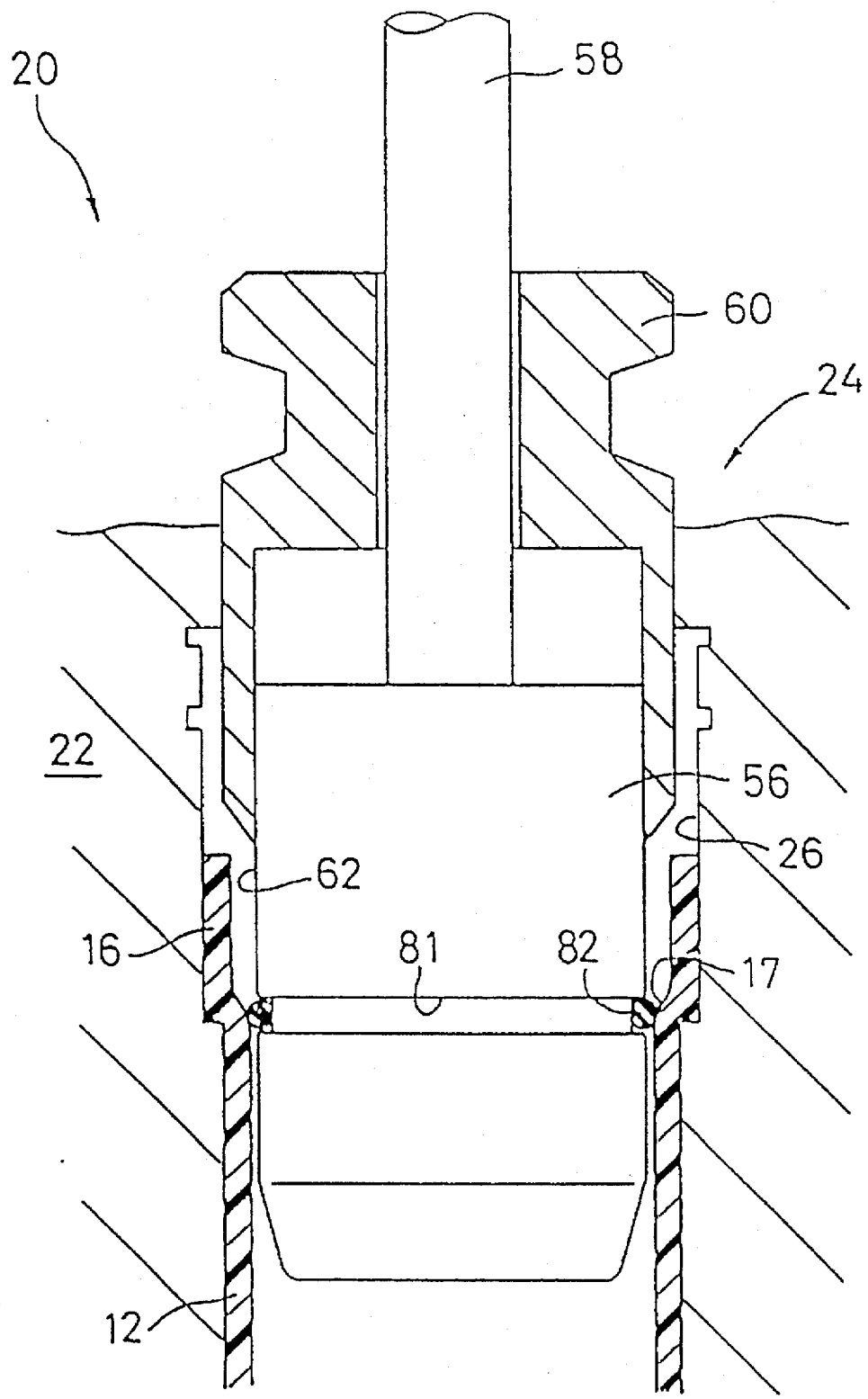
FIG. 18 is an explanatory view on a yet moreover preferred embodiment according to the present invention.
Figure 19:
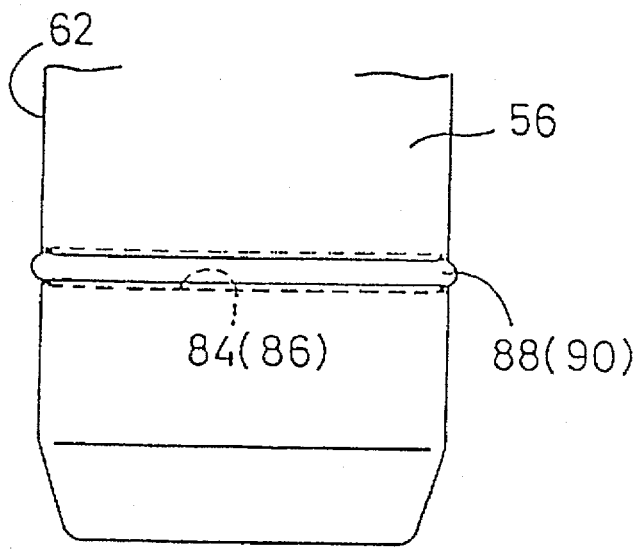
FIG. 19 is an explanatory view on a yet still moreover preferred embodiment according to the present invention.
Figure 19:
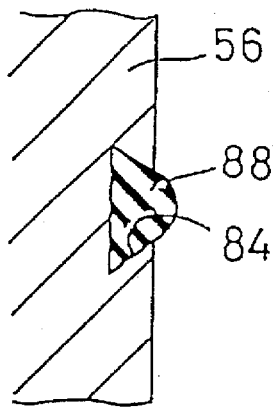
Figure 19:
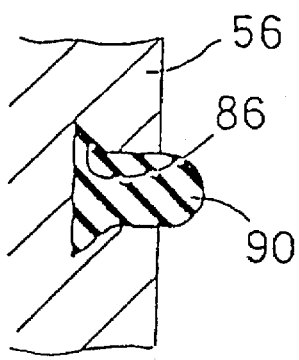
Figure 20:
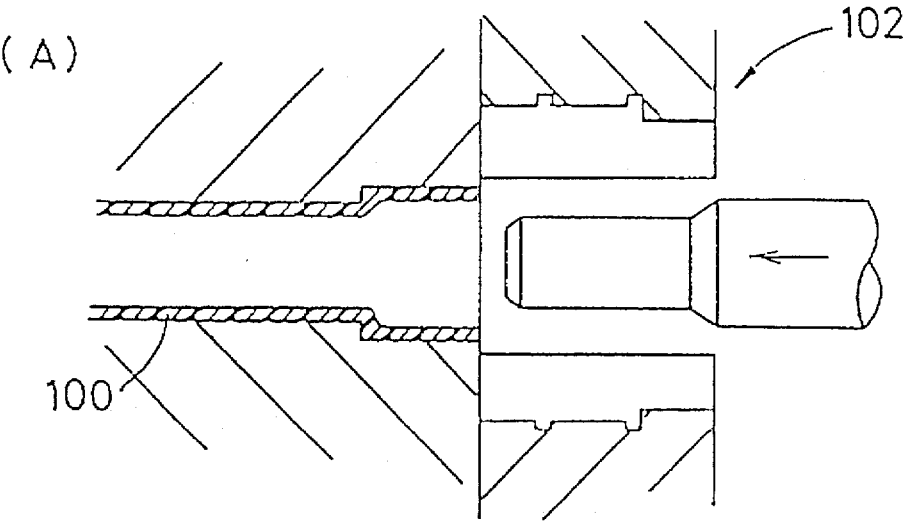
FIG. 20 is an explanatory view on a preferred embodiment according to the invention set forth in the application prior to the present application.
Figure 20:
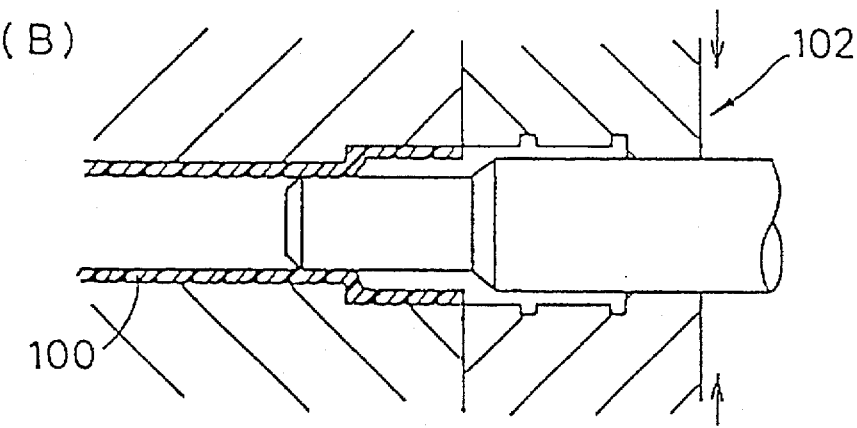
Figure 20:
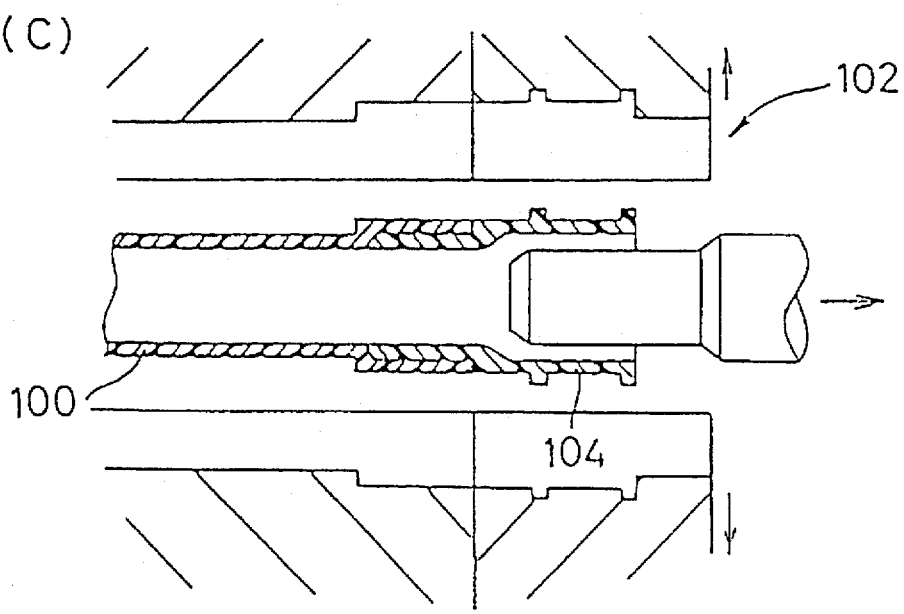
Figure 21:
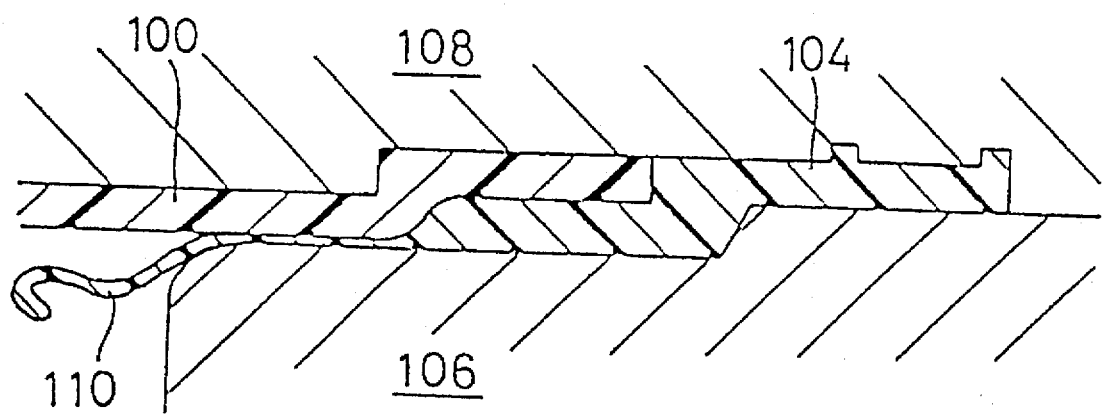
FIG. 21 is an explanatory view on the problems to be solved by the present invention.

FIG. 18 illustrates a yet moreover preferred embodiment according to the present invention, wherein the O-ring 82 is brought into contact with the aforementioned diameter-increasing portion 17 of the hose body 12, thereby carrying out the sealing. Additionally, FIG. 19 illustrates a yet still moreover preferred embodiment according to the present invention, wherein the sliding member is provided with a wedge-shaped groove 84 or 86, and, a rubber layer 88 or 90 are integrally bonded by vulcanization thereto in a burying state, instead of installing an O-ring thereto.

Having now fully described the preferred embodiments according to the present invention, they are one of the exemplifications. For instance, the present invention is applicable for injection molding branched portions which are extended out from the hose body in a direction perpendicular to the axis or with a predetermined angle, and which are designed for introducing blowby gases or achieving the other objects. Further, it is applicable to hoses whose hose bodies are forked in two branches or more.

Moreover, it is possible to constitute a part of the injection molding mold for forming the connecting portion by utilizing a part of the blow molding mold for forming the hose body. Thus, without departing from the spirit or scope of the present invention, the present invention can be carried out in modes which are modified variously according to the knowledge of one of ordinary skill in the art.

We claim:

1. A process for producing a resin hose comprising a hose body formed by blow molding and a connecting portion formed integrally to at least one end of said hose body by injection molding, comprising the steps of:

forming said hose body with thermoplastic resin by blow molding, setting said hose body in a forming mold having an inner mold and an outer mold, said inner mold being separated from said outer mold by a cavity and said inner mold having a front end portion for contacting an inner periphery surface of said one end of said hose body and closing an opening of said one end of said hose body, moving said inner mold into contact with said inner periphery surface of said one end of said hose body to close said opening of said hose body so as to form said cavity between said inner mold and said outer mold, and said front end portion of said inner mold having a tapered surface whose diameter decreases in a direction moving to a front end, said tapered surface being brought into contact with said inner periphery surface of said one end of said hose body, injecting a thermoplastic resin into said cavity to mold said connecting portion between said inner mold and said outer mold.

2. A process for producing a resin hose according to claim 1, wherein said front end portion of said inner mold has a portion made of an elastic material which is able to swell and is formed at an outer periphery surface of said front end portion and whose outside diameter is capable of being increased, and said cavity into which said resin is injected is formed between said inner periphery surface of said one end of said hose body, said inner mold and said outer mold.

3. A process for producing a resin hose according to claim 1, wherein said front end portion of said inner mold has a portion made of an elastic material which is able to swell and is formed at an outer periphery surface of said front end portion and whose outside diameter is capable of being increased, and said cavity into which said resin is injected is formed between an outer periphery surface of said one end of said hose body, said inner mold and said outer mold.

4. A process for producing a resin hose according to claim 1, wherein said front end portion of said inner mold includes a ring-shaped angular portion brought into contact with said inner periphery surface of said one end of said hose body, and said cavity into which said resin is injected is formed between said outer mold and an outer periphery surface of said one end of said hose body.

5. A process for producing a resin hose comprising a tubular hose body formed by blow molding and a connecting portion formed integrally to at least one end of said hose body by injection molding, comprising the steps of:

forming said tubular hose body of a thermoplastic resin by blow molding, setting said hose body in a forming mold having an inner mold and an outer mold, and said inner mold having a front end portion having a portion made of an elastic material which is able to swell and whose outside diameter increases for contacting an inner periphery surface of said one end of said hose body to close an opening of said one end of said hose body, swelling said elastic portion by a pressure fluid introduced into said inner mold, bringing said inner mold into contact with said outer mold in the axial direction while swelling said portion, said opening of said hose body thereby being closed so as to form a cavity between said inner mold and said outer mold, and injecting a thermoplastic resin into said cavity formed between said inner mold and said outer mold to mold said connecting portion.

6. A process for producing a resin hose comprising a tubular hose body formed by blow molding and a connecting portion formed integrally to at least one end of said hose body by injection molding, comprising the steps of:

forming said tubular hose body of a thermoplastic resin by blow molding, setting said hose body in a forming mold having an inner mold and an outer mold and said inner mold having a front end portion including an axial portion reciprocatable in an axial direction and having a tapered portion at an end of said axial portion, plural splits arranged in a ring-shape at an outer periphery surface of said axial portion movable in a radially outward direction upon engagement with said tapered portion and another portion of said front end portion being made of an elastic material which is able to swell for contacting an inner periphery surface of said one end of said hose body so as to close an opening of said one end of said hose body, bringing said inner mold into contact with said one end of said hose body while swelling said another portion by axial movement of said tapered portion, said opening of said hose body thereby being closed so as to form a cavity between said inner mold and said outer mold, and injecting a thermoplastic resin into said cavity to mold said connecting portion.

* * * * *